(12) United States Patent
Bakish

(10) Patent No.: US 8,286,493 B2
(45) Date of Patent: Oct. 16, 2012

(54) SOUND SOURCES SEPARATION AND MONITORING USING DIRECTIONAL COHERENT ELECTROMAGNETIC WAVES

(75) Inventor: Tal Bakish, Kiryat Ono (IL)

(73) Assignee: AudioZoom Ltd., Modiin (IL)

( * ) Notice: Subject to any disclaimer, the term of this patent is extended or adjusted under 35 U.S.C. 154(b) by 137 days.

(21) Appl. No.: 12/836,833

(22) Filed: Jul. 15, 2010

(65) Prior Publication Data

US 2010/0280826 A1 Nov. 4, 2010

Related U.S. Application Data

(63) Continuation-in-part of application No. 11/841,134, filed on Aug. 20, 2007, now Pat. No. 7,775,113.

(60) Provisional application No. 60/841,574, filed on Sep. 1, 2006.

(51) Int. Cl.
*G01H 9/00* (2006.01)
(52) U.S. Cl. .............................. 73/655; 73/596; 73/632
(58) Field of Classification Search .................... 73/655, 73/646, 596, 632; 356/432, 437; 381/56, 381/58, 172
See application file for complete search history.

(56) References Cited

U.S. PATENT DOCUMENTS

| | | | |
|---|---|---|---|
| 3,714,438 A | 1/1973 | Hahn et al. | |
| 5,175,713 A | 12/1992 | Ballard | |
| 5,192,979 A * | 3/1993 | Grage et al. | 356/28.5 |
| 6,317,237 B1 | 11/2001 | Nakao et al. | |
| 6,517,490 B1 | 2/2003 | Garlick | |
| 6,590,661 B1 * | 7/2003 | Shnier | 356/432 |
| 6,702,747 B2 | 3/2004 | Garlick | |
| 6,865,490 B2 * | 3/2005 | Cauwenberghs et al. | 702/17 |
| 7,073,384 B1 | 7/2006 | Donskot et al. | |
| 8,073,145 B2 * | 12/2011 | Kondo et al. | 381/56 |
| 8,094,828 B2 * | 1/2012 | Watanabe | 381/71.1 |
| 2005/0141900 A1 * | 6/2005 | Pocholle et al. | 398/186 |
| 2010/0060901 A1 | 3/2010 | Martin et al. | |

FOREIGN PATENT DOCUMENTS

GB 2142141 A 1/1985

OTHER PUBLICATIONS

Kunio Kashino et al., A Sound Separation System with the Ability of Automatic Tone Modeling, 1993, pp. 248-255.

* cited by examiner

*Primary Examiner* — J M Saint Surin
(74) *Attorney, Agent, or Firm* — Martin Fleit; Paul D. Bianco; Fleit Gibbons Gutman Bongini & Bianco PL

(57) ABSTRACT

An apparatus and a method that achieve physical separation of sound sources by pointing directly a beam of coherent electromagnetic waves (i.e. laser). Analyzing the physical properties of a beam reflected from the vibrations generating sound source enable the reconstruction of the sound signal generated by the sound source, eliminating the noise component added to the original sound signal. In addition, the use of multiple electromagnetic waves beams or a beam that rapidly skips from one sound source to another allows the physical separation of these sound sources. Aiming each beam to a different sound source ensures the independence of the sound signals sources and therefore provides full sources separation.

10 Claims, 9 Drawing Sheets

PRIOR ART

SOUND SOURCES SEPARATION AND MONITORING USING DIRECTIONAL COHERENT ELECTROMAGNETIC WAVES

PRIORITY

This application is continuation in part of application Ser. No. 11/841,134 filed on Aug. 20, 2007 claiming the priority of U.S. provisional application No. 60/841,574 filed on Sep. 1, 2006.

FIELD OF THE INVENTION

The present invention relates to coherent electromagnetic waves and more specifically, to remote sensing of sound sources using coherent electromagnetic waves.

BACKGROUND OF THE INVENTION

Vibrometry is the technical field of measuring vibrations of an object. In remote vibrometry, the vibrations are measured from a distance (aka no-contact vibrometry). One of the common ways to achieve vibrations remote-sensing is by using coherent electromagnetic waves (usually laser) and exploiting their physical properties.

Specifically, the vibrating object acts as a transducer by modifying the properties of the electromagnetic waves that hit it, according to the vibrations, prior to reflecting back the electromagnetic waves. As any sound source generates vibrations, coherent electromagnetic waves may be used to detect and sense sound. And indeed, many attempts have been made in the art of remote sound sensing and detection using coherent electromagnetic waves.

The majority of the coherent electromagnetic-waves-based sound vibrometers available today are configured so that the coherent electromagnetic waves are not directed at the vibrating sound source. Rather, the electromagnetic waves in these sound vibrometers are directed at objects that reflect the sound waves, usually flat surfaces such as windows and walls in the proximity of the sound generating object.

For example, U.S. Pat. No. 6,317,237 which is incorporated by reference herein in its entirety discloses a system wherein a laser beam is directed at a window pane of a building and the reflecting laser beam is received and analyzed to extract the sound waves (specifically human voices) generated within the building.

U.S. Pat. No. 5,175,713 which is incorporated by reference herein in its entirety, discloses a method for under-water sound sensing using laser beams directed at reflectors and analyzing the reflected beams in order to detect and sense under-water sound propagation.

Presently available remote sensing sound vibrometers use a variety of techniques to extract the information from the reflected beam. The traditional solution comprises an interferometer that conducts interference between the reflected beam and a reference beam. Another common technique is based upon the Doppler Effect. According to this technique, since the wavelength of the reflected beam is changed in accordance with the vibrations of the vibrating object that reflects the electromagnetic waves therefore the change in wavelength correlates to certain vibrations which in turn represent a specific sound signal.

Yet another technique involves the analysis of the speckle pattern. A speckle pattern is causes whenever a reflected beam of coherent light creates a spot containing a plurality of interferences. This results in a spot comprising varying intensity dotted pattern reflected from a vibrating surface. One of the ways to analyze a speckle pattern involves the use of a charge couple device (CCD) array or any other array of photosensitive cells serving as receiver units for the reflected speckle pattern, wherein digital signal processing methods help extract the sound signal.

FIG. 1 shows the general structure of a typical remote sound-sensing system according to the prior art. FIG. 1 shows a laser Doppler vibrometer 100 (LDV) which is one of the common embodiments for Doppler vibrometry. The LDV 100 transmits an outgoing laser beam 120 directed at a flat surface 140. The flat surface may be a window, a wall or a dedicated reflector that have been placed deliberately to act as sound reflector. A sound source 110 generates sound waves that hit the flat surface 140 which result in vibrations. The outgoing laser beam 120, upon hitting the flat surface 140 is reflected back to the LDV 100 wherein the properties of the reflected laser beam 130 has been modified due to the vibrations of the flat surface 140. Inside the LDV 100 the reflected beam is analyzed and compared with a reference beam (not shown) to reconstruct the sound that has been generated by the sound source.

The main drawback of currently available remote sound sensing systems is their poor ability of sound sources separation. This drawback is reflected in two manners: noise separation and blind sources separation. By relying on a beam reflected from a vibrating surface rather than directly the sound generating object, the systems according to the prior art are actually sensing the sound source's ambient, which may include noise that inherently reduces the quality of the sound sensing. In addition, by sensing a reflection from a surface, rather than the sound sources directly, the sound signal extracted actually represents the superposition of all the sound sources presented in the same close proximity. Noise filtering, as well as blind sources separation (the separation of the different unrelated sound sources) has to be performed using time-consuming and not always cost-effective digital signal processing (DSP) techniques.

It would be therefore advantageous to have an apparatus and a method that allows the physical separation of sources while monitoring the sound generated therefrom, as well as noise separation, without the use of complex DSP techniques, while retaining the high quality of remote sound sensing.

SUMMARY OF THE INVENTION

The present invention discloses an apparatus and a method that achieve physical separation of sound sources by pointing directly a beam of coherent electromagnetic waves (i.e. laser). Analyzing the physical properties of a beam reflected from the vibrations generating sound source enable the reconstruction of the sound signal generated by the sound source, eliminating the noise component added to the original sound signal. In addition, the use of multiple electromagnetic waves beams or a beam that rapidly skips from one sound source to another allows the physical separation of these sound sources. Aiming each beam to a different sound source ensures the independence of the sound signals sources and therefore provides full sources separation.

In some embodiments, the apparatus for sound source separation according to the present invention is a directional coherent electromagnetic wave based vibrometer. The vibrometer comprises a coherent electromagnetic wave beam transmitter connected to a control unit, which is connected in turn to a processing unit, which is connected in turn to a coherent electromagnetic wave beam receiver via said control unit. Upon operation, the transmitter transmits at least one coherent electromagnetic wave beam directly at least one vibrating sound source. the receiver then receives at least one coherent electromagnetic wave beam reflected directly from at least one vibrating sound source said the processing unit controls said transmitter's operation via said control unit that uses the information extracted from the reflected beam from said vibrating sound source to reconstruct the sound of said sound source whereby the sound of said sound source is being separated from other sound sources and ambient noise.

In some embodiments, a method for separating sound sources using remote sensing sound vibrometry is disclosed. The method comprises the following steps: transmitting at least one coherent electromagnetic wave beam directly at least one vibrating sound source; receiving at least one coherent electromagnetic wave beam reflected directly from at least one vibrating sound source and then analyzing information gathered from the coherent electromagnetic wave beam reflected directly from the vibrating sound source whereby the sound generated by said sound source is separated from other sound sources and ambient noise.

According to some embodiments of the present invention, there is provided a system of identifying and separating a plurality of sound sources in a predefined area. The system may comprise at least one optical transmission member, which transmits optical signals over the area; at least one optical receiver, which receives reflected optical signals arriving from the area, the reflected signals originating in the transmitted optical signals; and a processing unit which receives the reflected signals, and analyzes the received reflected signals. The analysis enables identifying relevant and irrelevant sound sources and separating each sound source from a plurality of sound sources simultaneously producing sound in the area, the processing unit outputs data relating to the identified relevant and irrelevant sound sources.

Optionally, the system further comprises a scanning unit operatively associated with the optical transmission member and the receiver, the scanning unit enables using the transmission member for transmitting optical signals through the area and using the receiver for receiving the reflected signals from the area.

Each of the optical receivers may optionally include a Doppler receiver, which enables extracting velocity of each sound source; the processing unit uses the velocity of each source to characterize frequency of the audio signal produced by the each sound source and outputs the frequency characterization data.

The system may further enable identification of direction of each received reflected signal and distance of each sound source, the processing unit calculates location of each sound source using the distance and direction.

The system may additionally comprise an audio system comprising a digital filter and at least one audio receiver. The audio receiver detects sounds in the area and outputs audio signals corresponding to the sounds and the digital filter receives data from the processing unit and the audio receiver, analyzes the data to identify relevant sound sources and irrelevant sound sources and outputs audio signals of relevant sound sources by filtering out audio signals relating to irrelevant signal, according to the analysis.

The digital filter may receive voice activity detection (VAD) data and frequency characterization data of each sound source from the processing unit and use the data to identify non-human noise and human speakers in the area and for distinguishing each the human speaker, the digital filter outputs audio signals of at least one relevant human speaker.

Optionally, the at least one optical transmission member comprises a plurality of laser devices, each adapted to transmit optical signals of a different frequency and spatial modulation, for allowing identifying location of each sound source by identification of a unique set of respective signals reflected from each the sound source.

According to yet other embodiments of the present invention, there is provided a system of identifying and separating a plurality of sound sources in a predefined area. The system may comprise an optical speaker detection system, which transmits optical signals, receives reflected optical signals originating from the transmitted optical signals and analyzes the received reflected signals for identification and distinguishing of the relevant sound sources; and an audio system which is configured to receive data relating to the each of the sound sources from the optical speaker detection system, analyze the data and output filtered audio signals of at least one relevant sound sources.

According to some embodiments of the present invention, there is provided a method of identifying and separating a plurality of sound sources in a predefined area. The method comprises transmitting optical signals over a predefined area; receiving reflected optical signals from the area, where the reflected optical signals are reflected from sound sources simultaneously producing sounds in the area; identifying velocity of each sound source according to the reflected optical signals; extracting audio signal of the sound sources using the velocity; identifying human speakers sound sources in the area by using VAD of the extracted audio signal; identifying frequency characterization of each sound source using the extracted audio signal; identifying relevant sound sources of human speakers using the frequency characterization; and outputting VAD data and frequency characterization.

The method may additionally and optionally include receiving audio signals from at least one audio receiver in the area, using the output data and the received audio signals to identify relevant human speakers and irrelevant sound sources in the area in real time, filtering out irrelevant sound sources and outputting audio signals of at least one of the relevant sound sources.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 7:
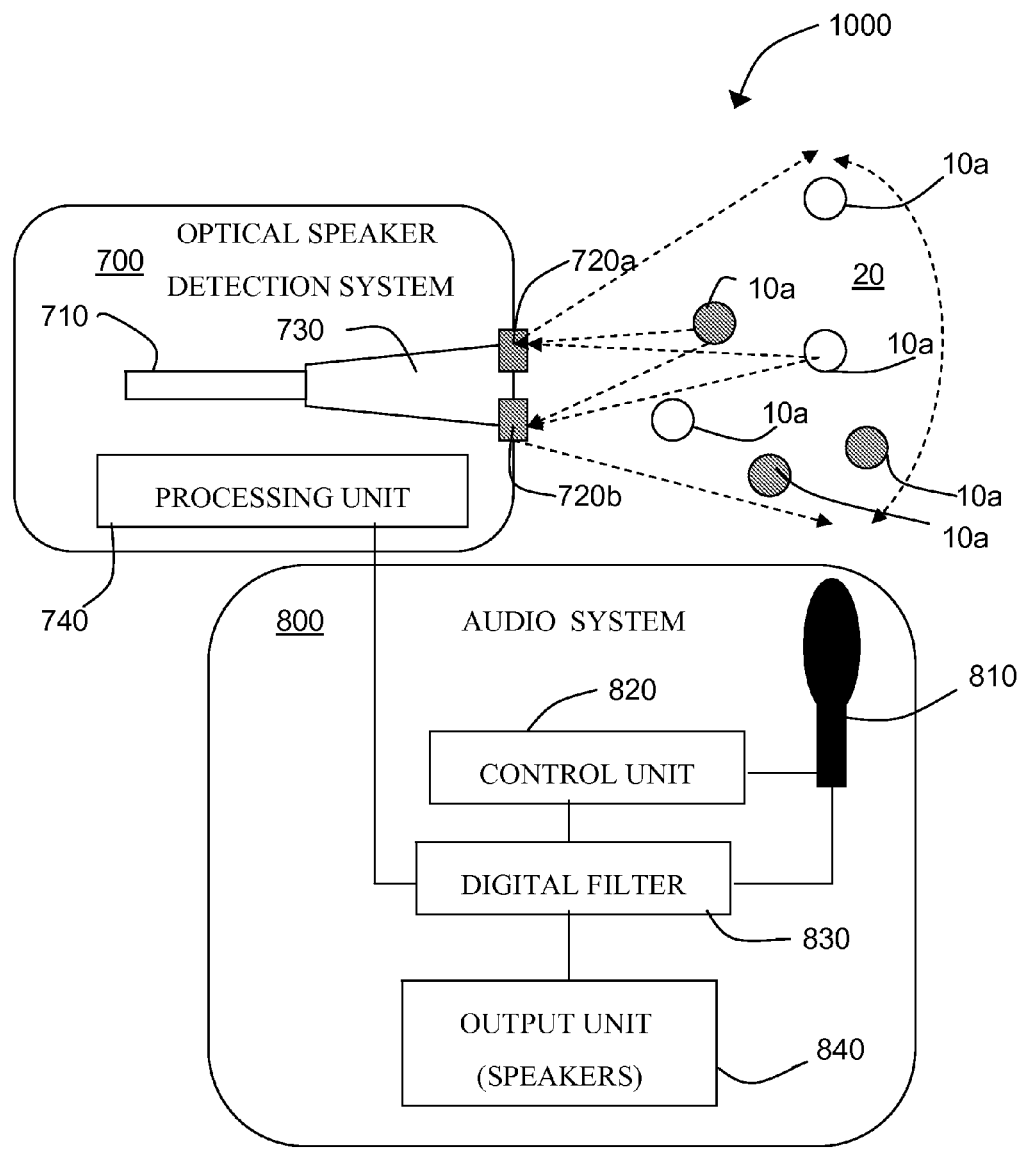
Figure 8:
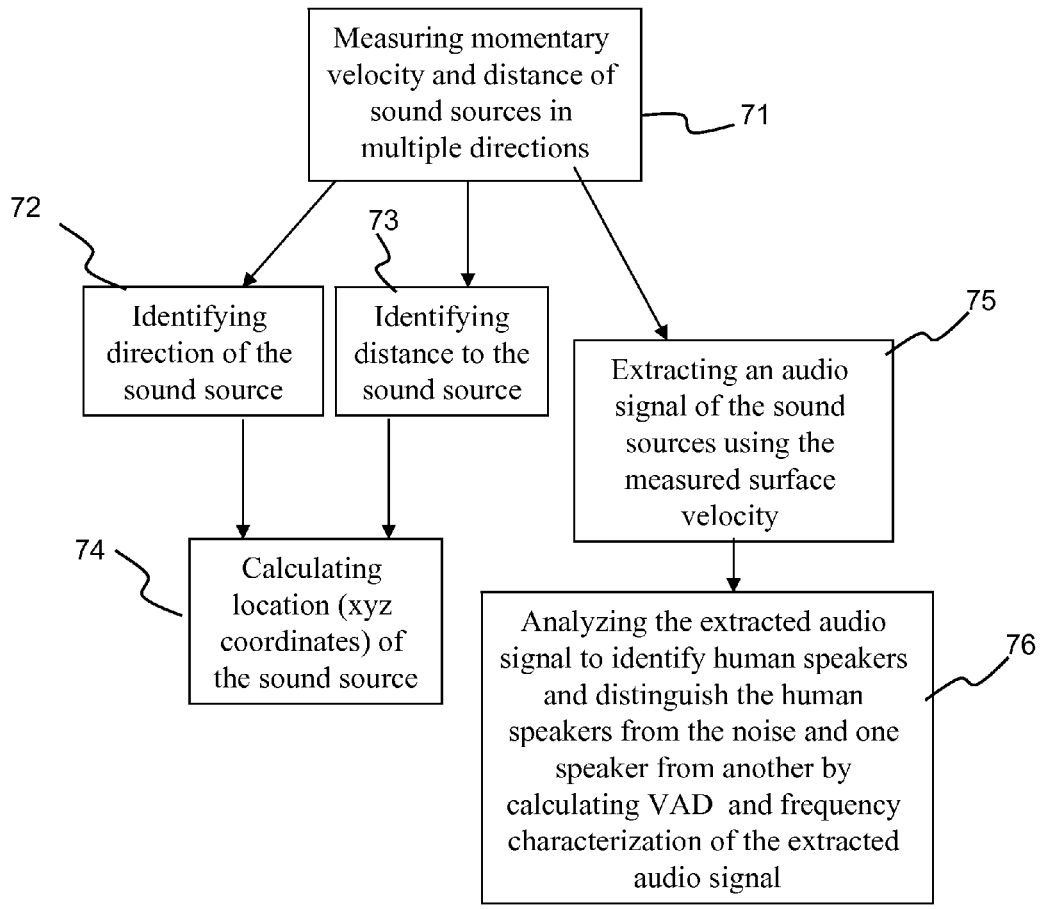
Figure 9:
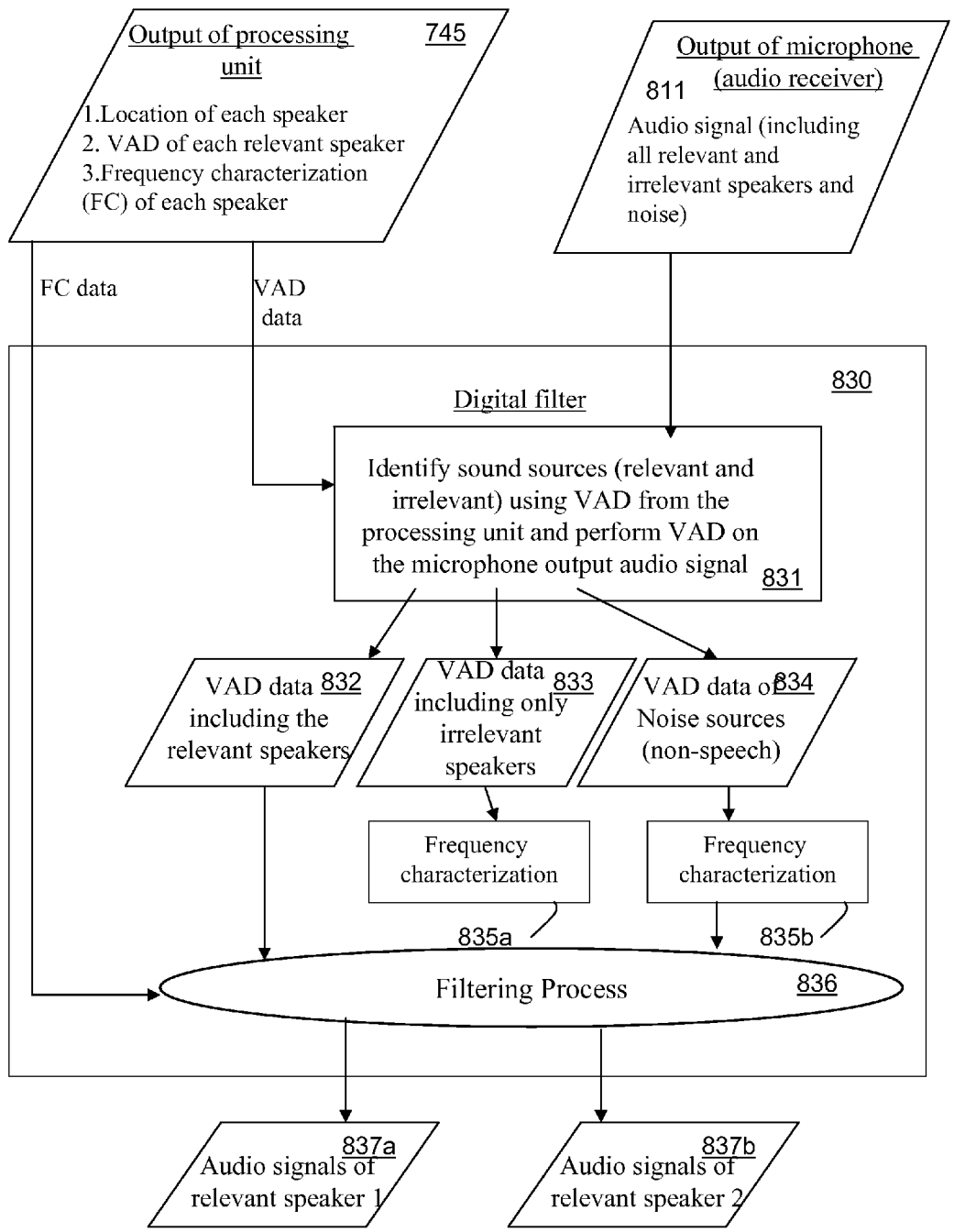

The drawings together with the description make apparent to those skilled in the art how the invention may be embodied in practice FIG. 7 schematically illustrates a system for detection and separation of sound sources, according to some embodiments of the present invention;

FIG. 8 schematically illustrates a process of identifying a relevant sound source of a human speaker, according to some embodiments of the present invention; and FIG. 9 schematically illustrates a process of identifying a relevant sound source of a human speaker and outputting a filtered audio signal of the relevant human speaker, according to some embodiments of the present invention.

Further, where considered appropriate, reference numerals may be repeated among the figures to indicate corresponding or analogous elements.

DETAILED DESCRIPTION OF THE INVENTION

Figure 1:
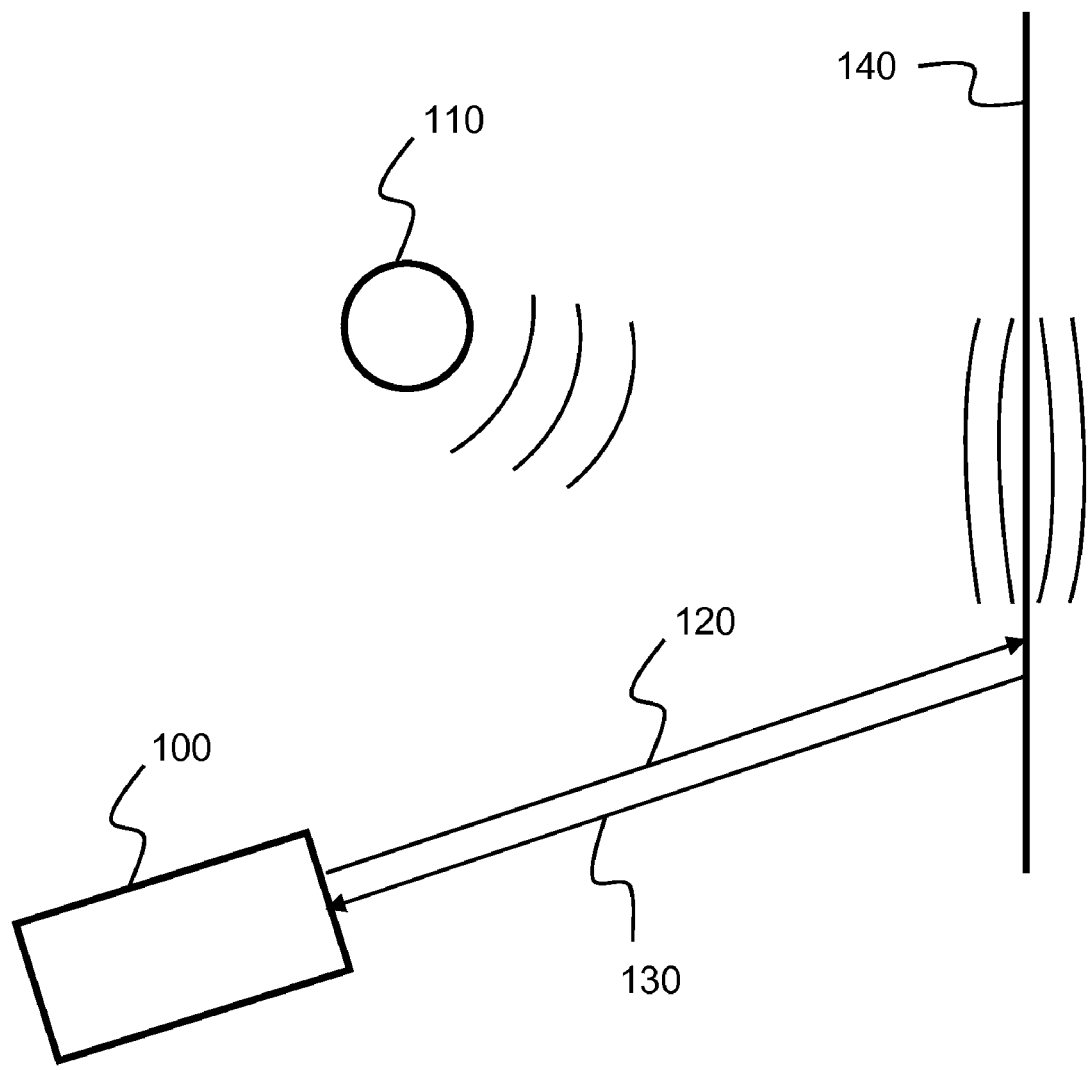
FIG. 1 is a schematic diagram showing a laser Doppler vibrometer according to the prior art.
Figure 2:
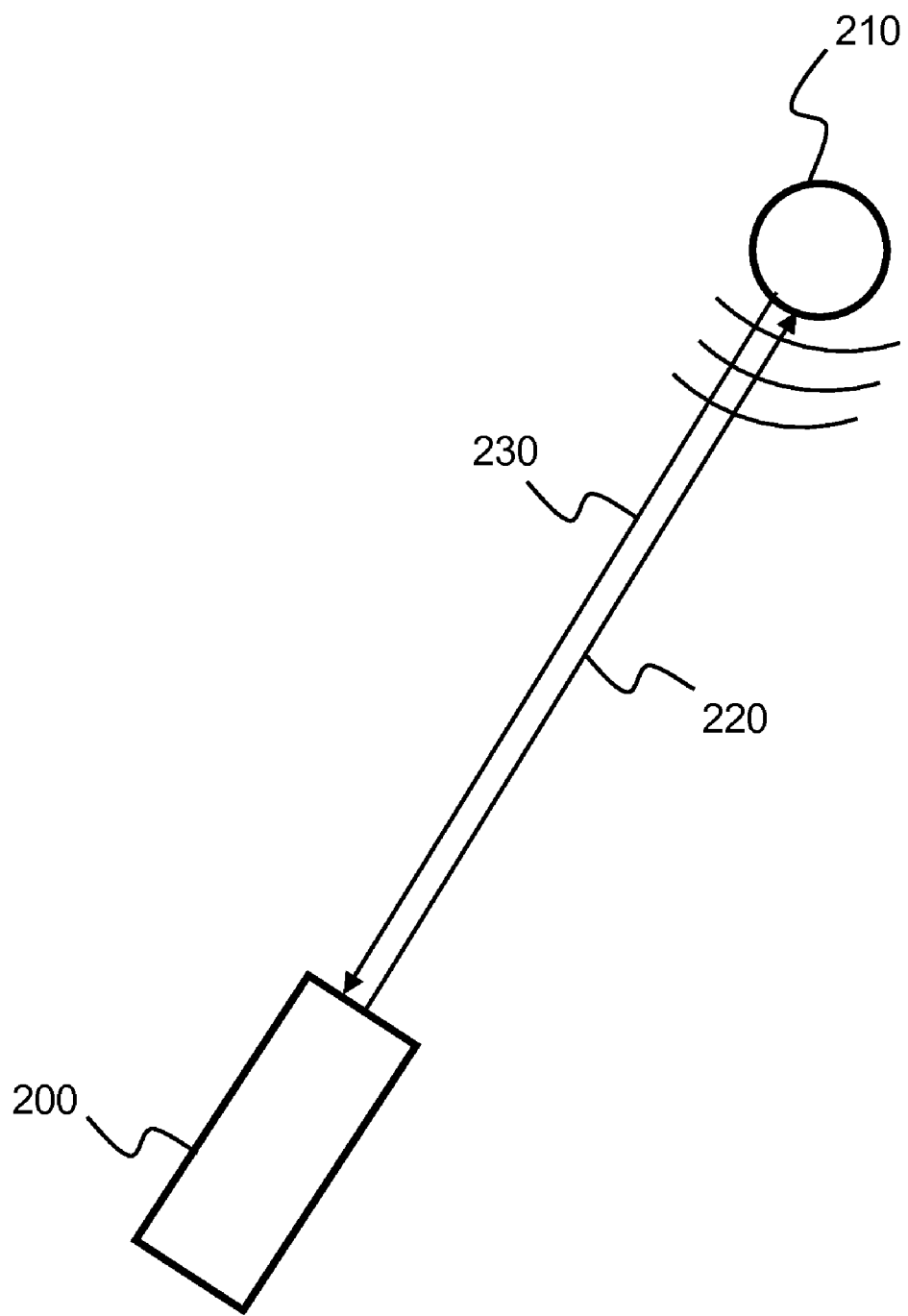
FIG. 2 is a schematic diagram showing the vibrometer according to the present invention.

FIG. 2 shows a schematic diagram of the operational environment according to the present invention. A remote sound sensing apparatus 200 generates an outgoing coherent electromagnetic waves beam 220 that is pointed directly on a vibrations generating sound source 210. Upon hitting the vibrations generating sound source 210, the outgoing coherent electromagnetic waves beam 220 is reflected and returns, with modified physical properties, as a reflected coherent electromagnetic waves beam 230, to the remote sound sensing apparatus 200. When directing the beam at the sound producing source the vast majority of the detected vibrations are related to the sound source. Since the vast majority of the sound producing vibrations related to a sound source are detected, a high degree of separation between the sound source and the ambient is thus achieved. This is due to the fact that the beam is pointed directly at the vibrations producing sound source.

According to some embodiments of the invention, the vibrations generating sound sources 210 may be human beings, wherein the vibrating object may be the skin around the face, lips and throat, but they may be any surface that is attached to the sounding board and/or source that created and/or amplifies the sound According to some embodiments of the invention, the information gathered from the reflected coherent electromagnetic waves beam 230 is extracted in more than one way. Existing techniques may be use. One technique is based on the Doppler Effect; another technique is performing a single interference; a third one is analyzing the speckle pattern—a spot containing multiple interferences.

Figure 3:
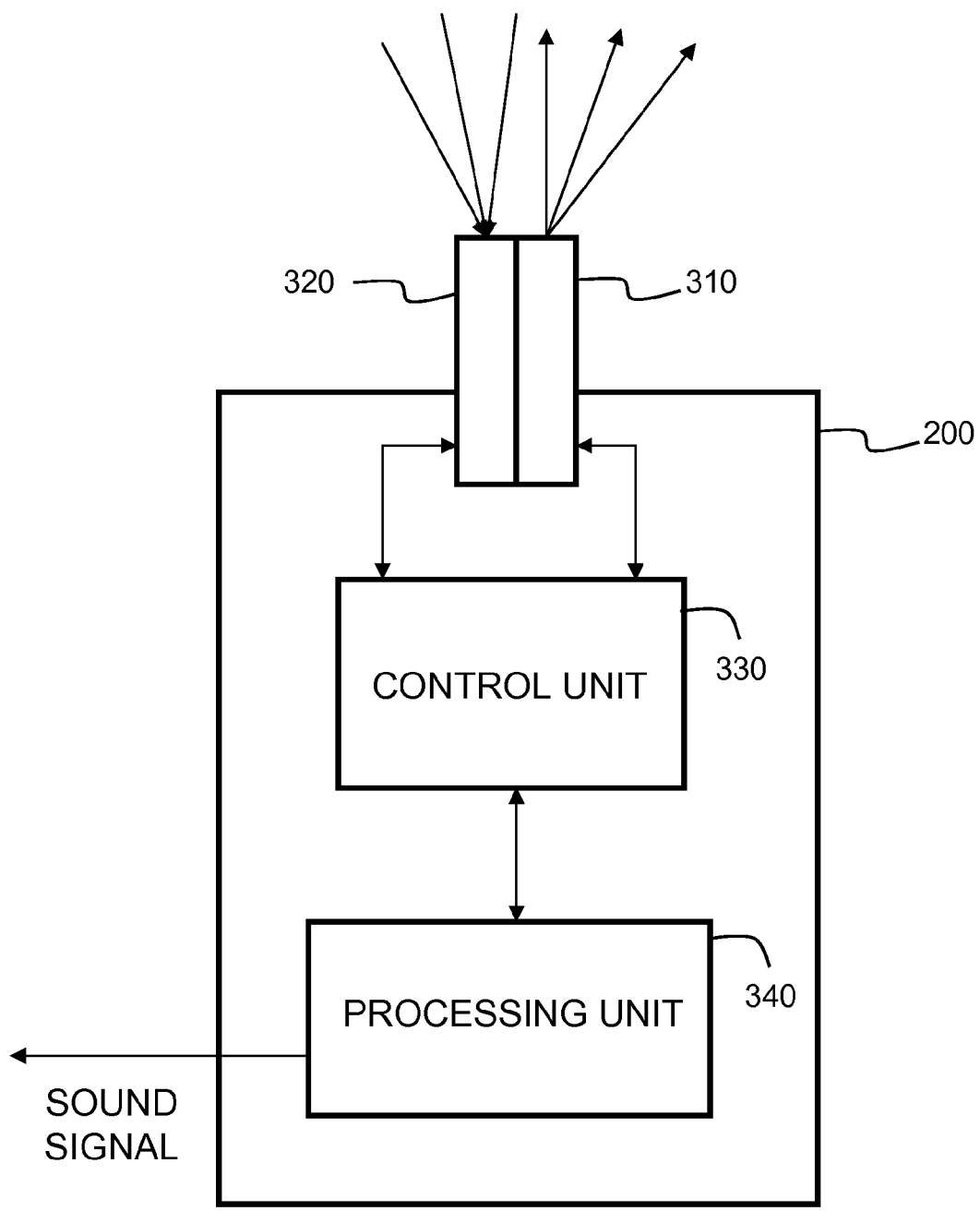
FIG. 3 is a schematic diagram showing the general structure of the vibrometer according to the present invention.

FIG. 3 shows a schematic block diagram of the structure of the remote sound sensing apparatus 200 according to some embodiments of the invention. The remote sound sensing apparatus 200 comprises a coherent electromagnetic wave beam transmitter 310 connected to a control unit 330, which is connected in turn to a processing unit, which is connected in turn to a coherent electromagnetic wave beam receiver 320 via said control unit 330. Upon operation, the transmitter 310 transmits at least one coherent electromagnetic wave beam directly on at least one vibrating sound source 210. the receiver 320 then receives at least one coherent electromagnetic wave beam reflected directly from at least one vibrating sound source 210 said the processing unit 340 controls said transmitter's operation via said control unit 330 that uses the information extracted from the reflected beam from said vibrating sound source 210 to reconstruct the sound of said sound source whereby the sound of said sound source is being separated from other sound sources and ambient noise.

According to some embodiments of the invention, each and every module of the invention may be implemented in any hardware or software form. For example, it may be implemented as an application specific integrated circuit (ASIC), as a digital signal processor (DSP), a field programmable gates array (FPGA), a software-based microprocessor or any combination thereof. Moreover, the receiver may be implemented with any array of electromagnetic sensitive cells, such as photo resistive transistors and/or diodes, built in charge coupled device (CCD) and complementary metal oxide silicon (CMOS) technologies and the like.

According to some embodiments, the Doppler Effect is used to extract the vibrations generated by the sound generating object and reconstruct the sound signals.

According to some embodiments of the invention, sound sources separation is achieved by spatial scanning of a plurality of sound sources, whereby at each time, only one beam is assigned at time to one sound source. Specifically, the apparatus according to the present invention generates a plurality of beams or alternatively, one beam that discretely scans the space according to a predefined pattern. At any specific time, a specific beam hits a specific sound source in a mutual exclusive manner and so the information gathered from this beam relates separately to the specific sound source. Thus, physical sources separation is achieved.

Figure 4:
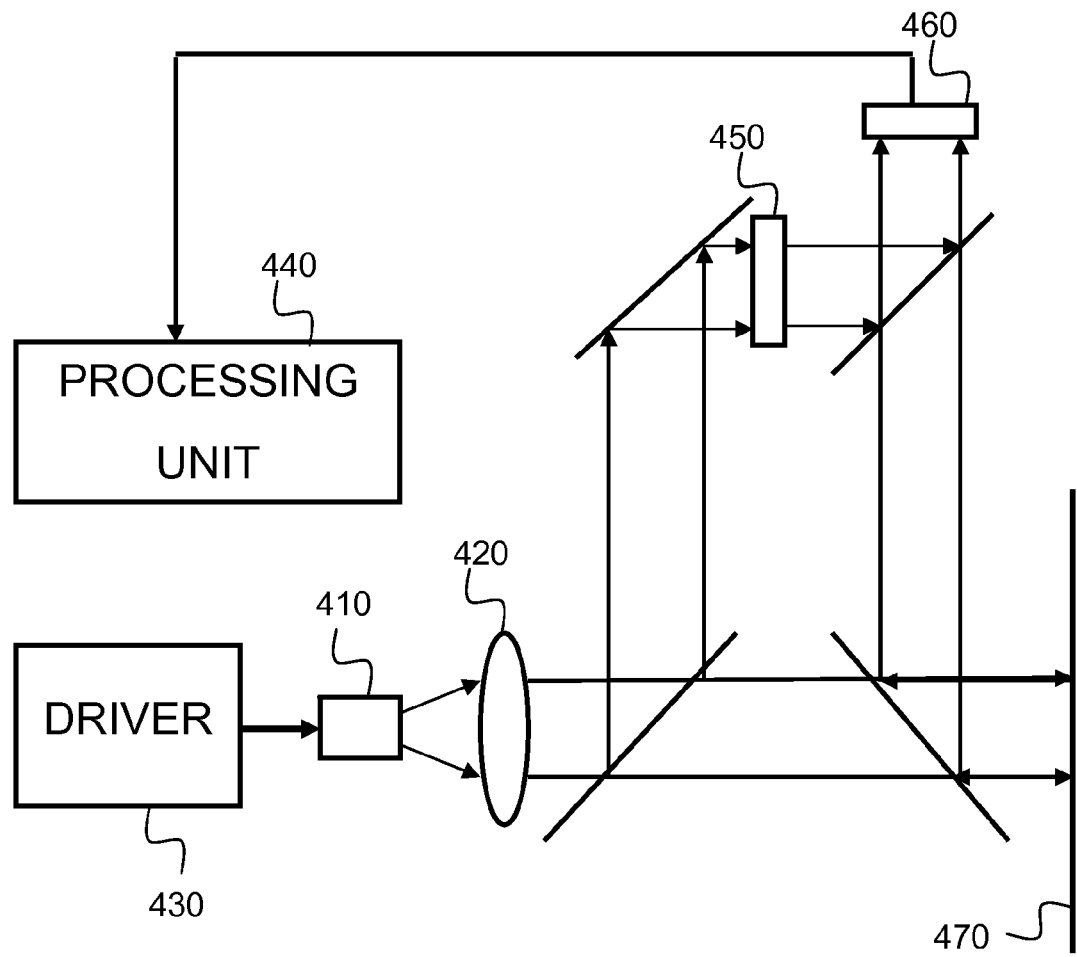
FIG. 4 is a schematic diagram showing an embodiment according to the present invention.

FIG. 4 shows an embodiment according to the invention. According to the embodiment, the vibrometer comprises a self-mixing diode 410 operated by a driver 430 and a collimating lens 420 that focuses the light and directs it on a vibrating sound source 470. The out-coming beam also passes through a modulator 450 that transfers part of the out coming beam to the photo diode 460. Additionally, the beam reflected from the sound source 470 hits a photo diode 460 that in turn transfers the signal to the processing unit 440 the reflecting beam enters the photo diode and cause instabilities that are analyzed in order to reconstruct the sound signal of the sound source.

Figure 5:
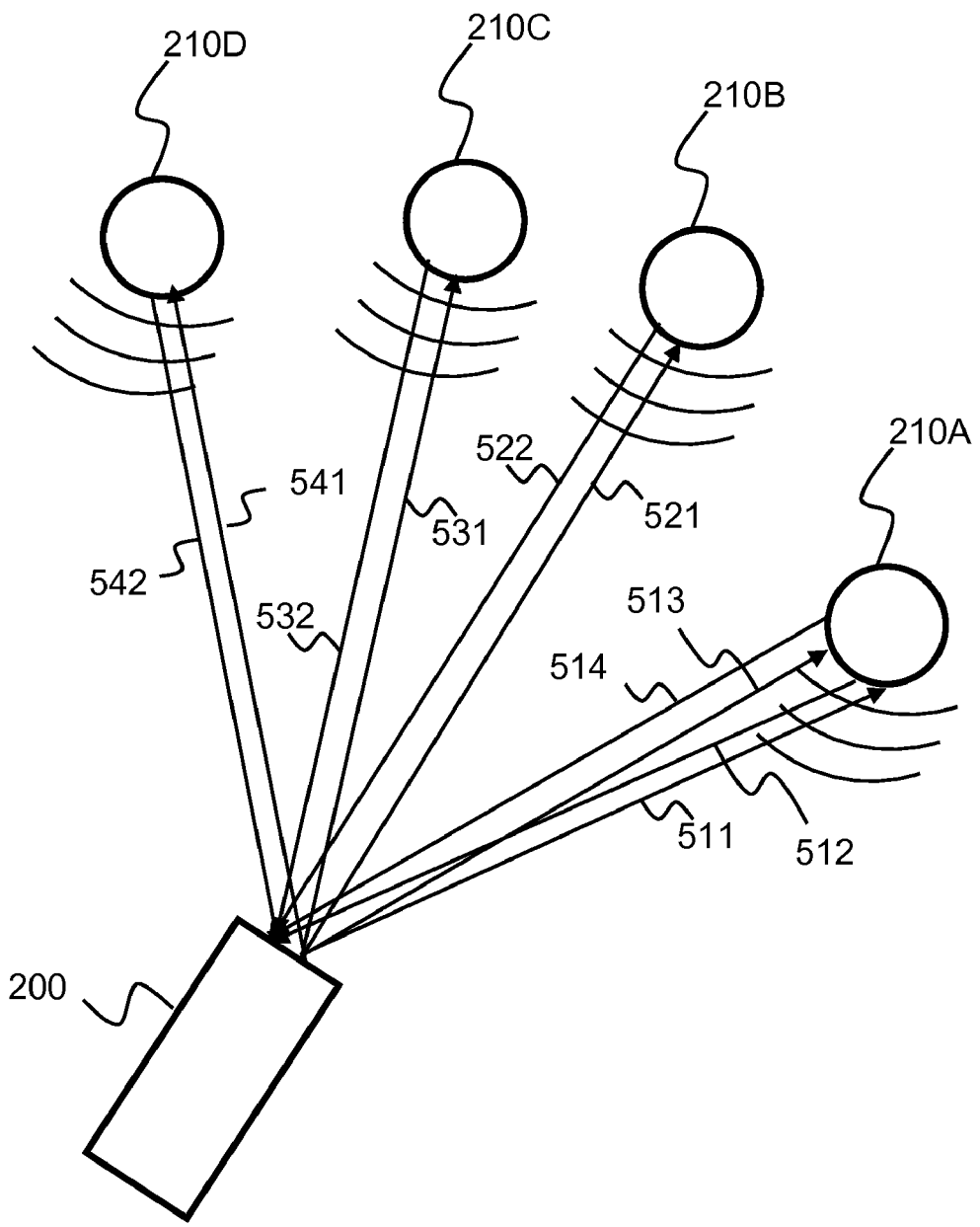
FIG. 5 is a schematic diagram showing an embodiment according to the present invention.

FIG. 5 shows the remote sound sensing apparatus 200 surrounded by a plurality of vibrating sound sources 510A-510D. The remote sound sensing apparatus 200 assigns a specific outgoing coherent electromagnetic waves beam 511, 521, 531 and 541. to each of the vibrating sound sources 210A-210D respectively. The reflected beams 512, 522, 532 may be related to each of the specific sound sources 210A-210D in a mutual exclusive manner and therefore source separation is achieved. Multi beam configuration may be achieved either by one beam that scans the space according to a discrete predefined pattern or by using several beams simultaneously. The scanning scheme is set by the processing unit 340 and controlled by the control unit 330 according to the sound sources spatial position.

According to some embodiments, in the case of several sound sources, the vibrometer may utilize several scanning scheme that may define the size of the spatial angular step which determines the size of a 'cell' in which a sound source may be detected independently. The scanning scheme may be also determined by the scanning frequency and the amount of time the beam stays directed at each discrete step.

Figure 6:
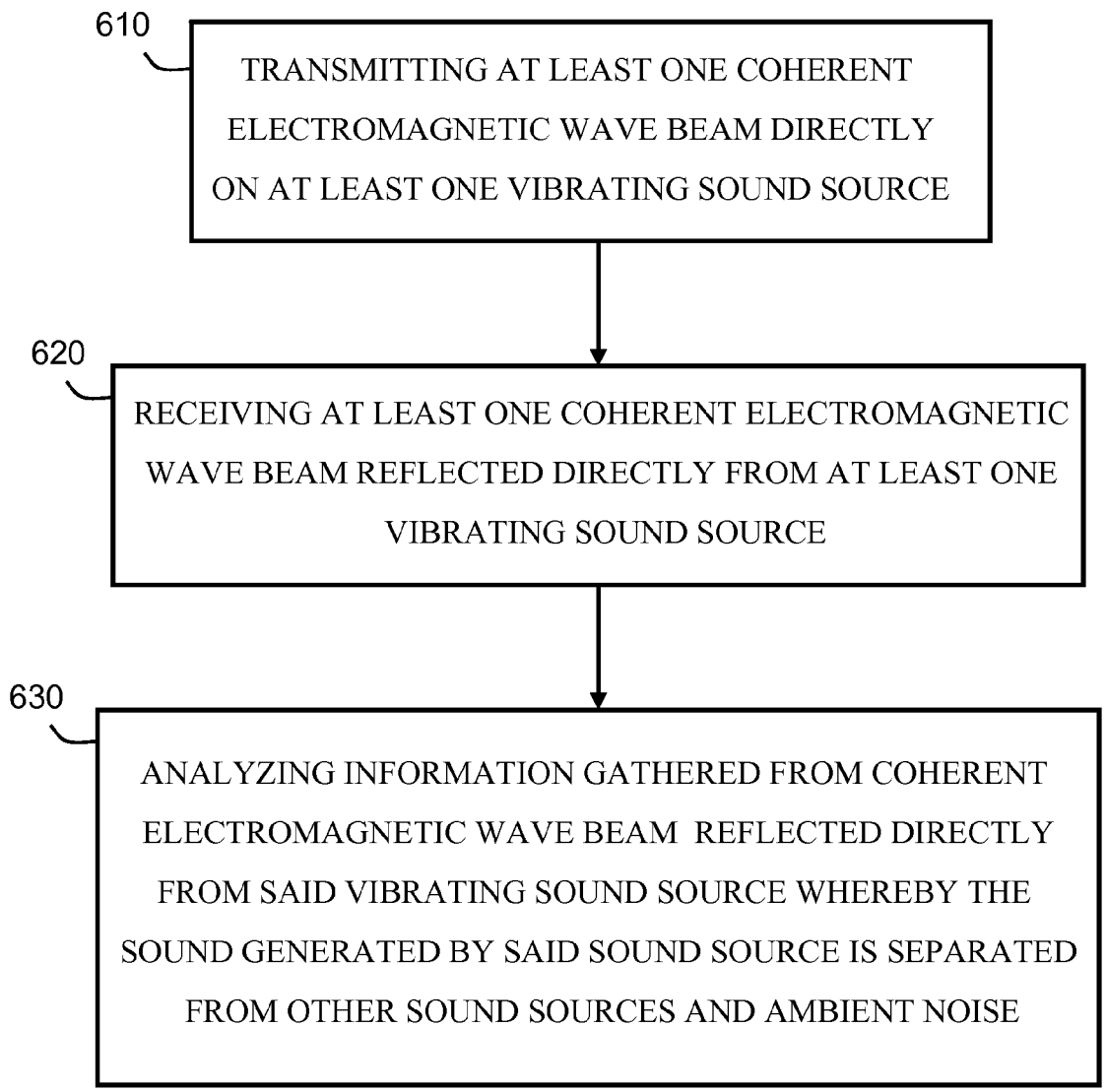
FIG. 6 is a flowchart showing the method according to the present invention.

FIG. 6 shows a flowchart describing the steps of the method disclosed according to the present invention. In block 610 at least one coherent electromagnetic wave beam is transmitted directly on at least one vibrating sound source; Then, in block 620 at least one coherent electromagnetic wave beam reflected directly from at least one vibrating sound source is received and finally, in block 630 the information gathered from the coherent electromagnetic wave beam reflected directly from the vibrating sound source is analyzed whereby the sound generated by said sound source is separated from other sound sources and ambient noise.

According to other embodiments of the invention, various DSP techniques may be used to further enhance the quality of the sound signal reconstructed from the information extracted from the reflecting beam. Specifically, these DSP techniques may be used to improve the separation of the sound source that has been greatly improved by the present invention.

Reference is now made to FIG. 7, which schematically illustrates a system 1000 for detection and separation of sound sources, according to some embodiments of the present invention. The system 1000 allows optically scanning a predefined area 20 in which multiple sound sources produce sounds, identifying relevant and irrelevant sound sources and filtering irrelevant sound sources to create a virtual environment including only the relevant sound sources, their location and other data relating to the audio signals they produce, thereby enabling to distinguish and separate each relevant sound source.

The system 1000 comprises an optical speaker detection system (OSDS) 700, which identifies a plurality of sound sources in a predefined area 20, enabling thereby to distinguish each of the sound sources. The OSDS 700 allows distinguishing between irrelevant sound sources such as noise and human speakers that are not relevant and relevant sound sources such as relevant human speakers. The OSDS 700 further distinguishes between a plurality of sound sources producing sounds simultaneously within a particular period of time.

The OSDS 700 includes an optical transmission member 710, which transmits optical signals, a plurality of Doppler optical receivers 720a and 720b each receives reflected optical signals arriving from sound sources in the area 20, such as sources 10a, 10b, 10c, 10d, 10e and 10f. The reflected signals originate from the transmitted optical signals and reflected from surfaces such as from vibrating surfaces of human speakers, objects, machines or any other sound sources.

The optical transmitting member 710 may produce optical signals within a predefined frequency/wavelength range. The transmitted signal may be of a relatively large coherence length in relation to the distance from the target reflective surfaces. The transmitted signal may be modulated to enable extraction of additional information such as distance to the target.

The Doppler receivers 720a and 720b use Doppler-based techniques for identifying reflected signals and measuring parameters thereof, such as amplitude, frequency and velocity of the sound source as well as distance to the reflective surface of the sound source and displacement changes of the sound source. One technique includes creating interference between the received reflected signal and a reference signal (which may be the transmitted signal, using interferometery or the signal in the laser source cavity using self-mix techniques). The Doppler shift of the received reflected signal, which corresponds to the velocity of the sound source from which the signal is reflected and therefore to the vibration frequency thereof, can be extracted from an output signal outputted from the interference pattern of the received reflected signal and the reference signal. In case where a self-mix technique is used, the Doppler shift is extracted from the laser source electronic driver circuit. The direction and intensity of the Doppler shift may be calculated, using the interference output signal. The intensity and direction corresponds to the velocity of the reflective surface and hence enables calculating the vibrating frequency of the sound source.

The OSDS 700 additionally includes a scanning unit 730, which allows optically scanning the area 20 using the transmission member 710 to transmit the optical signals over the area 20 and the receiver 720 for receiving the reflected signals. The scanning unit 730 enables discrete or continuous transmission of the optical signals by, for example, using moving or stationary reflective surfaces to reflect optical beam transmitted from the transmission member 710 over the area 20.

The scanning unit 730 may include any scanning means known in the art such as vibrating mirrors arrays (for example using MEMS technology or electric motors), rotating polygon with reflective edges, phase array technology that uses arrays of phase elements and waveguides adapted according to the frequency range of the transmitted signals, and the like.

The scanning unit 730 allows transmission of optical signals to a plurality of points in space as well as receiving signals from a plurality of reflecting points in space while isolating and distinguishing each reflecting point. According to some embodiments of the present invention, the scanning rate of the scanning unit 730 may be higher than the sampling of frequency required for each reflecting point, which is up to 8 KHz for human voice. This means that the sampling frequency may be achieved by multiplying the estimated number of human speakers by the sampling frequency required for each reflecting point (for example for measuring 2 sources we need 2 times 8 KHz which is 16 KHz scanning rate).

The scanning may be two-dimensional, meaning scanning of a surface area, or three-dimensional, meaning scanning of a 3D space area, depending on predefined system 1000 configuration.

In a case where the scanning is two-dimensional, the third dimension (e.g. depth) may be achieved by different kinds of modulation of the signal according to the range gate of the reflected signal such as AM, FM, PM modulation and the like.

The OSDS 700 additionally includes a processing unit 740 connected to the scanning unit 730 and/or each receiver 720a and 720b. The processing unit 740 receives the reflected signals data from the scanning unit 730 and/or the receivers 720a and 720b and/or Doppler shift data, and processes the signals data.

According to some embodiments of the present invention, the processing unit 740 receives the reflected optical signals and data relating to the direction of the respective transmitted signal of each reflected signal and the distance to the target sound source. The data may further include the velocity of the sound source from which the optical signal is reflected extracted from the Doppler shift as explained above. The processing unit 740 then calculates the location of each sound source by using the direction of the transmitted signal to extract the direction angle and the modulation of the transmitted signal to extract the distance data. The processing unit 740 uses the velocity of the sound source at each given moment to extract a pattern of the audio signal of the sound source. The extracted audio signal is then analyzed to allow identification of human sound sources using one or more voice activity detection (VAD) algorithms, which allow identifying when the received signal includes human speech and when only noise is received. The processing unit 740 additionally analyzes the extracted audio signal for frequency characterization for allowing distinguishing and separating human speakers and thereby identifying whether there is more than one speaker. The frequency characterization may include pitch detection of the frequency of the audio signal, where each human speech has a typical pitch frequency allowing identifying if the sound source is of a human speaker and/or whether there is a plurality of speakers simultaneously speaking at a given moment. Each speaker is identified since each speaker is likely to have a different pitch characterization.

Therefore, the optional outputs of the processing unit 740 include at least one of: (1) the VAD data; (2) the location of each identified human speaker sound source; (3) the momentary velocity of each identified sound source; (4) the frequency characterization of each human speaker sound source; and/or (5) the extracted audio signal of each speaker.

The system 1000 may include more than one OSDS.

The system 1000 may further include an audio system 800 operatively associated with the processing unit 740. The processing unit 740 transmits the VAD data, the location data and a velocity indication signal of each identified sound source to the audio system 800. The audio system 800 further processes the received data to identify relevant and irrelevant sound sources, to identify "pure noise" of non-human speakers and to filter out irrelevant sound sources and noise to output clear filtered audio signals of the relevant sound sources only.

As illustrated in FIG. 7, the audio system 800 includes a digital filter 830, which receives the VAD data and the frequency characterization and, optionally, the location data, outputted by the processing unit 740 as well as audio signals from at least one audio receiver 810 such as a microphone of the audio system 800, analyzes the received data, filters out identified irrelevant signals and noises and outputs filtered audio signals of identified relevant sound sources to an output unit 840, which may be any device or system that allows outputting (such as voicing) of audio signals such as audio speakers, and the like.

The audio receiver 810 is positioned in the area 20 of the sound sources, and receives audio signals from these sources. The audio receiver may be any receiver known in the art that can detect sound and output an analogue or a digital audio signal corresponding to the detected sound, such as a microphone, and/or an array of microphones.

The digital filter 830 may additionally execute one or more additional simple VAD processing on the audio signal received from the audio receiver 810 to allow distinguishing between noise and human speakers. The noise detection may allow basic initial separation of noise from human speakers using the audio signal only. The noise identification may be improved over time with each iteration of processing, where VAD of a time frame in the audio signal received from the audio receiver 810 is used to improve noise detection in VAD of next received time frames of the audio signal.

The digital filter 830 identifies human speakers as well as noise that is non-human by using the VAD data outputted by the processing unit 740 as well as VAD data of the audio signal. Once the human speakers sound sources are identified and distinguished in time domain (e.g. detect if the relevant sound source exist in the audio signal at each time frame) the digital filter 830 uses the frequency characterization data from the processing unit 740 (for example: pitch frequency) of each human speaker sound source to distinguish between relevant and irrelevant sound sources that exist in the same time frame in the received audio signal. This allows identifying each human speaker within a time domain and frequency domain and separating each identified speaker from other speakers as well as identification of a human speaker in relation to other types of sound sources defined as noise. The frequency characterization also allows distinguishing one or more relevant speakers from non-relevant speakers in the area 20.

According to some embodiments of the invention, the digital filter 830 may filter out the irrelevant sound sources outputting a clean audio signal of the identified relevant sound source(s).

According to some embodiments of the present invention, the OSDS 700 may be a laser Doppler vibrometer, which enables transmission of optical signals of a narrow coherent frequency band, receiving reflected signals and analyzing frequency changes of the reflected signals. The laser Doppler vibrometer outputs the velocity of each reflecting surface according to the reflected signal frequency changes. The velocity changes allow extracting or calculating the vibrations of a surface from which the signal is reflected.

The transmission member 710 may include a plurality of laser devices, each adapted to transmit optical signals of a different frequency and spatial modulation, for allowing identifying location of each sound source by identification of a unique set of respective signals reflected from each sound source.

For example, three laser devices; each laser device transmits an optical signal of a different frequency and is located at a different position. Each laser device additionally transmits discrete pulses of optical signals, each at a different pulsation rate where the rate of each laser device changes in relation to the angular transmission direction to allow separating each transmitted and therefore, each respective reflected optical signal. Since each signal transmitted from each laser is of a different frequency, pulsation rate and transmission direction, each reflective point in space reflects three different distinguishable signals. Therefore, each reflecting point in space reflects a unique triple-set of signals, encoding the reflected signal thereby and allowing distinguishing and identifying the location of the reflective point thereby.

According to some embodiments of the present invention, the audio system 800 further includes a control unit 820, which connects to the outputs of the digital filter 830 and to the at least one audio receiver 810. The control unit 820 may allow controlling positioning, switching and/or amplification of the audio receiver 810 according to the outputs of the digital filter 830. For example, the control unit 820 receives location of each relevant sound source and directs the positioning of the audio receiver 810 as close as possible to the relevant sound source(s) so as to allow optimal receiving of relevant audio signals. Alternatively, in a case where there is a plurality of audio receivers 810, the control unit 820 may allow switching off receivers 810 that are far from the relevant sound sources and switching on receivers that are closer to the relevant sound sources at each given moment and change the switching setup in real time according to the changing identification of relevant sound sources and/or their locations in the area 20 over time.

Reference is now made to FIG. 8, which schematically illustrates a real time process of identifying a relevant sound source of a human speaker, which is carried out by the processing unit 740, according to some embodiments of the present invention. The receivers 720a and 720b allow measuring velocity and distance of sound sources in multiple directions 71. The direction of each reflected signal can be extracted from the direction of transmission of a respective transmitted signal. The processing unit 740 uses direction of each sound source 72 and distance between the optical measuring device (e.g. the OSDS 700) and the sound source 73 to calculate location of each sound source 74 by calculating the coordinates in space (xyz) of the source. The processing unit 740 additionally uses the velocity at the given moment to extract an audio signal 75. The extracted audio signal is then analyzed for identification of human speakers and separation of the identified human speakers by executing VAD algorithm over the extracted audio signal to identify whether human speech is detected at the given moment in time. If and when human speech is detected the processing unit 740 performs a frequency characterization of the extracted audio signal to identify the relevant human speaker. The extracted audio signal from the OSDS contains only the relevant human speaker, since the optical transmitted signal is directed to a single direction at each time.

Reference is now made to FIG. 9, which schematically illustrates a process of identifying a relevant sound source of a human speaker associated with one time frame, according to some embodiments of the present invention. The processing unit 740 outputs data 745 including: (1) location of each relevant speaker sound source at a predefined time frame; (2) VAD data of each relevant speaker sound source at a predefined time frame; and (3) frequency characterization data of each relevant speaker sound source at a predefined time frame. The audio receiver 810 (microphone) outputs an audio signal of all sounds in the area 811. The data 745 from the processing unit 740 and the audio signal 811 are received by the digital filter 830 and analyzed thereby 831. The analysis 831 includes identifying noise using a VAD algorithm applied on the audio receiver 810 (microphone) outputted audio signal 811.

According to some embodiments of the present invention, a time frame can be selected based on the system computing power, which is typically between 1-100 ms.

The digital filter 830 uses the VAD data of each relevant speaker from the output of processing unit 745 to identify whether the measuring from the audio receiver 810 within the specific time frame includes relevant speakers' speech, where this data also includes irrelevant speakers' speech. The digital filter 830 further uses another VAD algorithm 831 on the audio signal 811 to identify whether a speaker or speakers of any kind are detected within the specific time frame in the audio signal 811. In one case in which the VAD from the processing unit 745 detects human speaker, results in outputting 832 the audio signal 811 which includes relevant and maybe other irrelevant speakers. In the case in which the VAD from the processing unit 745 does not detect relevant speaker speech and the VAD on the audio signal 831 detects human speech, the measuring includes irrelevant speakers only 833. In the case where the VAD on the audio signal 831 does not detect human speech, the measuring includes only non-speech noise 834. In the case where there is an identification of relevant speaker(s) by the VAD data from the processing unit 745, the data outputted 832 includes the relevant speaker and optionally also irrelevant speakers, since the VAD cannot distinguish the relevant speakers from irrelevant speakers in the audio signal 811 that are in the same time frame. In another case, where only noise is detected, this analysis results in outputting noise data 834 detected by using the VAD 831 of the audio signal 811.

The digital filter 830 then executes frequency characterization of the irrelevant speakers 835a and of the noise 835b to allow improving identification of noise and irrelevant speakers in future time frames processing and filtering.

The digital filter 830 then executes a filtering process 836 in which it uses the frequency characterization data of each relevant speaker from the data 745 received from the processing unit 740 and the frequency characterization of the irrelevant speakers 833 and the frequency characterization of the noise 834, to identify the relevant speakers from the outputted VAD data 832 which includes the relevant and irrelevant speakers at the same time frame. This allows filtering out the noise and irrelevant speakers audio signals from the received audio signal 811 and outputting clean and filtered output audio signals of each of the relevant speakers. In cases where more than one OSDS 700 are used, each pointed at a different relevant speaker in the area 20, or in cases where one OSDS 700 scans the area 20, a plurality of separate data outputs 745 are received from one or more processing units 740 for each relevant speaker.

The digital filter 830 outputs a different and separate audio signal for each relevant speaker such as output audio signals 387a and 837b, where each filtered audio signal may be outputted through a different output port or channel of the digital filter 830.

The digital filter 830 may additionally output location data received from the processing unit 740 of each relevant sound source in applications of the system 100 that require real time identification of each speaker at any given moment. For example, the system 1000 may be applicable in electronic interactive games where the location of each player needs to be identified in real time when speaking.

Additionally or alternatively, the system 1000 may be used for allowing only authorized speakers to be amplified by the audio system 800 enabling, for example, to output only audio signals related data that are associated with a speaker that is currently authorized to be amplified. For example, in a television panel discussion or a forum, where many speakers simultaneously talk and only one of them should be heard. In this case, the system 1000 filters out sounds from the rest of the speakers and other noises and only amplifies the relevant speaker to allow an audience to hear the authorized speaker only.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A system of identifying and separating a plurality of sound sources in a predefined area, said system comprising:
    at least one optical transmission member, which transmits optical signals over said area;
    at least one optical receiver, which receives reflected optical signals arriving from said area, said reflected signals originating in said transmitted optical signals;
    an audio system, which detects sounds in said area and outputs audio signals corresponding thereto; and
    a processing unit which receives said reflected signals originating from said optical receiver and said audio signals outputted by said audio system, and analyzes said reflected and audio signals for identifying relevant and irrelevant sound sources, and separating each sound source from a plurality of sound sources simultaneously producing sound in said area, said processing unit outputs data relating to said identified relevant and irrelevant sound sources.

2. The system of claim 1, further comprising a scanning unit operatively associated with said optical transmission member and said receiver, said scanning unit enables using said transmission member for transmitting optical signals through said area and using said receiver for receiving said reflected signals from said area.

3. The system of claim 1, wherein said at least one optical receiver includes a Doppler receiver, which enables extracting velocity of each sound source, said processing unit uses said velocity of each source to characterize frequency of the audio signal produced by said each sound source and outputs said frequency characterization data.

4. The system of claim 1 enables identification of direction of each received reflected signal and distance of each sound source, said processing unit calculates location of each sound source using said distance and direction.

5. The system of claim 1, wherein said audio system comprises a digital filter and at least one audio receiver, said audio receiver detects sounds in said area and outputs audio signals corresponding to said sounds and said digital filter receives data from said processing unit and said audio receiver, analyzes said data to identify relevant sound sources and irrelevant sound sources and outputs audio signals of relevant sound sources by filtering out audio signals relating to irrelevant signal, according to said analysis.

6. The system of claim 5, wherein said digital filter receives voice activity detection data and frequency data of each sound source from said processing unit and uses said data to identify non-human noise and human speakers in the area and for distinguishing each said human speaker, said digital filter outputs audio signals of at least one relevant human speaker.

7. The system of claim 1, wherein said at least one optical transmission member comprises a plurality of laser devices, each adapted to transmit optical signals of a different frequency and spatial modulation, for allowing identifying location of each sound source by identification of a unique set of respective signals reflected from each said sound source.

8. A system of identifying and separating a plurality of sound sources in a predefined area, said system comprising:
    an optical speaker detection system, which transmits optical signals, receives reflected optical signals originating from said transmitted optical signals and analyzes the received reflected signals for identification and distinguishing of said relevant sound sources; and
    an audio system which is configured to receive data relating to said each of the sound sources from said optical speaker detection system, analyze said data and output filtered audio signals of at least one relevant sound sources.

9. A method of identifying and separating a plurality of sound sources in a predefined area, said method comprising:
    transmitting optical signals over a predefined area;
    receiving reflected optical signals from said area, said reflected optical signals are reflected from sound sources simultaneously producing sounds in said area;
    identifying velocity of each sound source according to said reflected optical signals;
    extracting audio signal of said sound sources using said velocity;
    identifying human speakers sound sources in said area by using voice activity detection (VAD) of said extracted audio signal;
    identifying frequency characterization of each sound source using said extracted audio signal;
    identifying relevant sound sources of human speakers using said frequency characterization; and
    outputting VAD data and frequency characterization.

10. The method of claim 9, further comprising, receiving audio signals from at least one audio receiver in said area, using said output data and said received audio signals to identify relevant human speakers and irrelevant sound sources in said area in real time, filtering out irrelevant sound sources and outputting audio signals of at least one of said relevant sound sources.

* * * * *